United States Patent
Heck et al.

(10) Patent No.: US 8,205,545 B2
(45) Date of Patent: Jun. 26, 2012

(54) MELON CUTTING APPARATUS

(75) Inventors: Richard D. Heck, Lucerne Valley, CA (US); Henry A. Affeldt, Jr., Llano, CA (US)

(73) Assignee: HAA Consulting, Llano, CA (US)

( * ) Notice: Subject to any disclaimer, the term of this patent is extended or adjusted under 35 U.S.C. 154(b) by 782 days.

(21) Appl. No.: 12/147,760

(22) Filed: Jun. 27, 2008

(65) Prior Publication Data

US 2009/0007804 A1 Jan. 8, 2009

Related U.S. Application Data

(60) Provisional application No. 60/947,506, filed on Jul. 2, 2007.

(51) Int. Cl.
*B26D 11/00* (2006.01)
(52) U.S. Cl. .......................... 99/543; 99/541
(58) Field of Classification Search .............. 99/541, 99/543, 537–538, 545, 506, 507, 508; 83/620, 83/633, 392, 114, 588, 662, 857, 856, 858, 83/932, 605, 613; 30/114, 172, 169, 302, 30/314, 315, 317, 347, 313
See application file for complete search history.

(56) References Cited

U.S. PATENT DOCUMENTS

| | | | |
|---|---|---|---|
| 2,824,588 A | 2/1958 | Leander et al. | |
| 4,175,690 A | 11/1979 | Bova et al. | |
| 4,571,832 A | 2/1986 | Hendy et al. | |
| 5,373,781 A | 12/1994 | Knasel | |
| 5,463,943 A | 11/1995 | Knasel | |
| 5,624,696 A | 4/1997 | Watanabe et al. | |
| 5,660,104 A | 8/1997 | Heinzen et al. | |
| 5,664,490 A | 9/1997 | Tompkins et al. | |
| D396,536 S | 8/1998 | Goll et al. | |
| 5,937,524 A | 8/1999 | Hornsby | |
| 6,314,872 B1 * | 11/2001 | Collins | 99/516 |
| 6,418,823 B1 | 7/2002 | Taitler | |
| 6,748,854 B2 * | 6/2004 | Barnard | 99/541 |
| 7,086,155 B2 * | 8/2006 | Chan et al. | 30/114 |
| 7,096,777 B1 | 8/2006 | Healy | |
| 2003/0079616 A1 | 5/2003 | Barnard | |

FOREIGN PATENT DOCUMENTS

| | | |
|---|---|---|
| EP | 1759819 A1 | 3/2007 |
| FR | 2658110 | 8/1991 |
| GB | 2286110 A | 8/1995 |

* cited by examiner

*Primary Examiner* — Quang Van
*Assistant Examiner* — Phuong Nguyen
(74) *Attorney, Agent, or Firm* — Antoinette G Giugliano, Esq.; AGG Intellectual Property Law

(57) ABSTRACT

The present invention relates to a melon cutting apparatus that cuts a melon portion or melon half. The apparatus cuts the melon pulp into sections, and removes the rind from the pulp. The apparatus includes a base having an opening; a cutting matrix that has a plurality of blades, wherein the cutting matrix communicates with the opening. The apparatus also includes a sweeping blade that is curved and positioned at or near the cutting matrix and is used to cut the rind from the melon pulp. The apparatus further includes an actuator that engages the sweeping blade. The apparatus embodies an arm attached to the apparatus, and a pressure cap that is mounted to the arm, opposite the cutting matrix. Additionally, the present invention pertains to systems and methods of using the apparatus.

21 Claims, 7 Drawing Sheets

MELON CUTTING APPARATUS

RELATED APPLICATION

This application claims the benefit of U.S. Provisional Application No. 60/947,506, filed Jul. 2, 2007.

The entire teachings of the above application are incorporated herein by reference.

BACKGROUND OF THE INVENTION

Melons such as cantaloupe and honeydew are often served as slices or cubes. Many times, the rind can be attached or removed from the pulp of the melon. Typically, cutting a melon involves cutting the melon into slices and then removing the rind from the pulp, e.g., with a pairing knife. One can then cut the melon into cubes or other geometric shapes. This process can be time consuming, and repeated handling of the fruit increases the probability of fruit contamination, fruit damage (bruises, off-color, decay, seeping juice, torn edges), or personal injury to the person cutting the melon.

Accordingly, a need exists for an apparatus to section a melon in fewer steps. A further need exists to do so in an efficient, less time consuming manner. Yet a further need exists to reduce the amount of handling of the melon to reduce potential contamination or injury.

SUMMARY OF THE INVENTION

The present invention relates to a melon cutting apparatus that cuts a melon portion, or in an embodiment, a melon half. The apparatus cuts the melon portion into sections and cuts the rind away from the melon pulp. In particular, the apparatus includes a base or support having an opening; a cutting matrix that has one or more (e.g., a plurality of) blades, wherein the cutting matrix communicates with the opening. The apparatus also has a sweeping blade that is curved or otherwise mated to the shape of the cutting matrix and includes a first end and a second end, and the first and second ends are positioned at or near the cutting matrix. Additionally, the apparatus includes an actuator that engages the sweeping blade. In an embodiment, the apparatus has an arm, and a pressure cap that is mounted to the arm, and positioned opposite the cutting matrix. An embodiment includes an apparatus with an arm that is removably attached, e.g., with a pin to an arm extension, which is mounted to the base. The apparatus also includes one or more legs that support the base. The cutting matrix of the present invention forms, in one aspect, a semispherical or semi-elliptical shape. The apparatus of the present invention includes one or more guides mounted to the base to guide the melon onto the cutting matrix. In an instance, the apparatus of the present invention includes an adjustable pressure cap. The actuator, in an embodiment, rotates the sweeping blade so that the sweeping blade's path forms essentially a semispherical or semi-elliptical shape, e.g., about the cutting matrix.

In particular, an embodiment of the present invention pertains to a melon cutting apparatus that cuts a melon half. The melon half includes melon pulp (e.g., the meat of the melon) and melon rind. The apparatus embodies a base plate having an opening; one or more legs that support the base plate; and a cutting matrix that comprises a plurality of blades, wherein the cutting matrix communicates with the opening and forms essentially a semispherical or semi-elliptical shape. The apparatus further embodies a sweeping blade that has a first end and a second end, and the first and second end are positioned at or near the cutting matrix; and wherein the blade is curved. An actuator is also included in the apparatus. The actuator engages the sweeping blade, wherein when the actuator rotates the sweeping blade, the sweeping blade's path forms essentially a semispherical or semi-elliptical shape about the cutting matrix. The apparatus also has an extension (e.g., an arm extension) attached to the base plate; an arm removably attached to the arm extension; and a pressure cap (e.g., adjustable) that is mounted to the arm, opposite the cutting matrix. Use of this apparatus cuts the melon pulp into sections and removes the melon rind. The apparatus further includes one or more guides mounted to the base to guide the melon onto the cutting matrix.

The present invention also relates to methods of using the melon cutting apparatus described herein. The methods embody the steps of placing a melon half on the cutting matrix; applying pressure to the arm to section the melon pulp; and engaging the actuator to cut the rind from the melon half to thereby release the sectioned melon. The methods also include lifting the arm of the apparatus and removing the rind.

Methods of the present invention further pertain to assembling the melon cutting apparatus described herein. The assembly includes attaching the legs to the base plate; and attaching the arm to the arm extension or to the base plate. In an embodiment, the methods for assembly include inserting the cutting matrix and/or attaching the sweeping blade.

Yet another aspect of the present invention relates to a melon cutting system. The system includes one or more of the parts described herein. In particular the system includes: a base plate having an opening; one or more legs that support the base plate; one or more cutting matrixes, wherein a cutting matrix comprises a plurality of blades that form essentially a semispherical or semi-elliptical shape; one or more sweeping blades wherein the sweeping blade is curved; an actuator; an arm; a pressure cap, or a combination thereof. An embodiment of the system also includes a bowl.

The melon cutter apparatus of the present invention advantageously allows one to cut a melon in a few easy steps. The apparatus uniquely allows one to do two types of cutting: cut the melon from the rind and cut the melon into sections. The apparatus saves the user time, is safer to use, and is much more efficient than the melon cutting devices known in the art. The design of the apparatus is also easy to use and clean.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to a melon cutter apparatus. In particular, the apparatus of the present invention includes a unique combination of blades that allows the melon to be cut from the rind, but also into a multitude of sections (e.g., cubes or other geometric shapes). Upon cutting the melon into sections and separating the melon from the rind, the sections are released into a bowl, while the rind which remains with the apparatus can be easily discarded.

The melon cutting apparatus of the present invention has at least two types of blades, the matrix which cuts the melon pulp into sections, and a sweeper blade which cuts the rind away from the melon pulp. The melon cutting apparatus cuts the melon in several directions. As the melon is being pushed into the matrix, the melon is cut with cross-sectional blades in a downward motion and the sweeper blade travels in a circular motion to separate the rind. As the melon is cut with the cross-sectional blades in the downward motion, the melon is actually being cut in a multitude of directions because the matrix, in an embodiment, forms a semicircular shape to complement the shape of a melon half. Basically in an embodiment, one can, in two motions, cut a melon half into multiple sections and separate it from the rind.

In an embodiment, a melon includes any melon belonging to the Cucurbitaceae family. Examples of such melons include cantaloupe, honeydew, watermelon, canary melon, casaba, hami melon, navajo yellow, piel de sapo, santa claus, the sugar melon, ambrosia melon, bailan melon, galia, ogen, persian, sharlyn melons, crenshaw, and crane melon. New melon species including those that are genetically engineered can also be used with the present invention. The melon is cut into a portion, such as a half, quarter, third, or wedge, and the melon portion (e.g., melon half) is placed into the apparatus for sectioning and rind removal. Preferably seeds are removed as well. As used herein, the melon has at least two parts: the melon pulp and the melon rind. The melon pulp refers to the meat of the melon, the portion that is generally eaten. The rind of the melon is the portion of which includes the skin.

Figure 1:
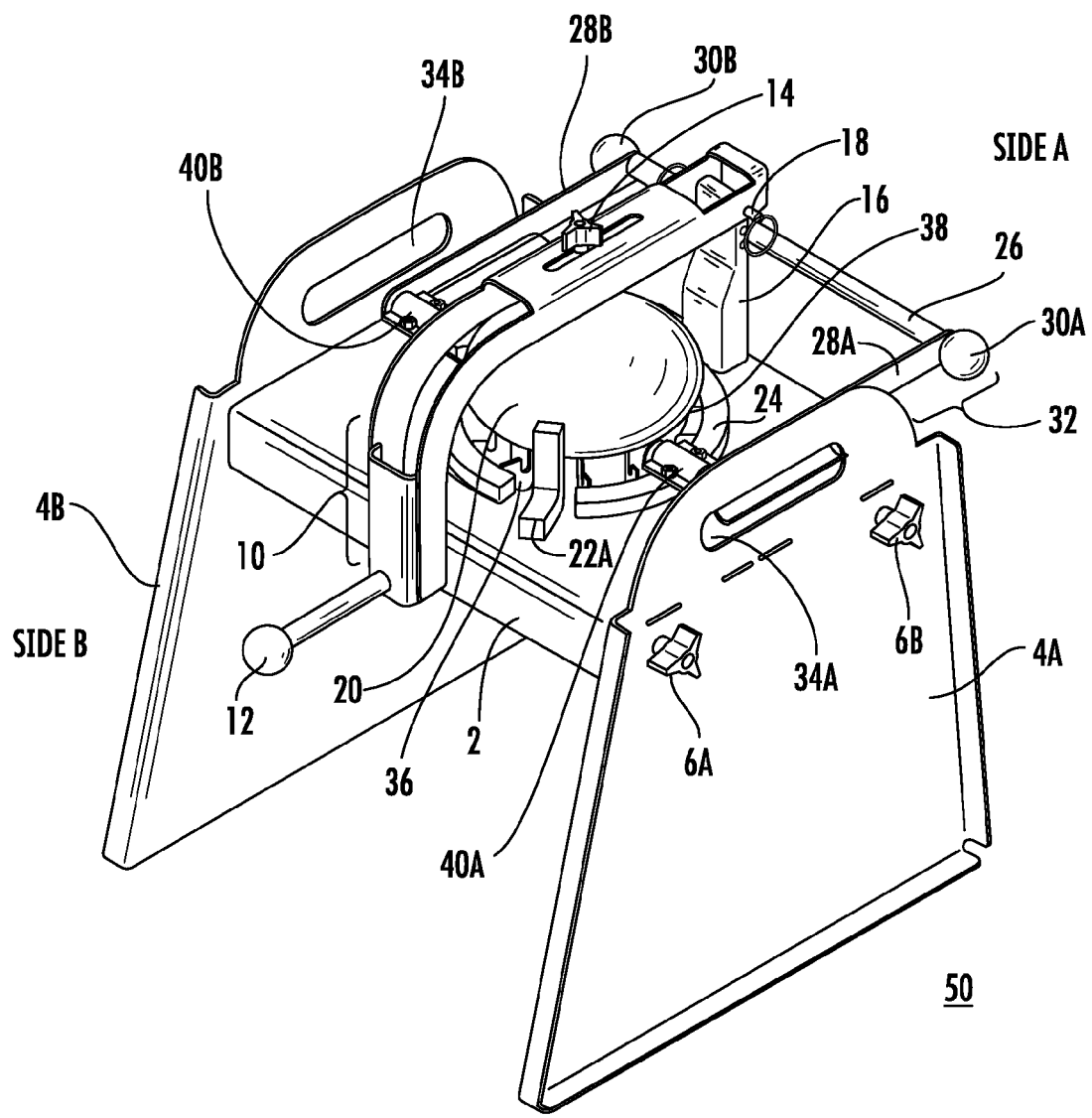
FIG. 1 is a schematic drawing of a perspective view showing the front and side of the apparatus of the present invention.

Referring to FIG. 1, apparatus 50 of present invention includes base plate 2 that receives the cutting matrix. Base plate 2, shown in the figure, is held in essentially a horizontal position by legs 4A and 4B and attached thereto by thumb screws 6A-6D. The base plate and leg configuration of the apparatus acts primarily as a support for the cutting apparatus. Any type of support can be used to hold the cutting apparatus in place. For example, the support can be a single molded piece, shaped as a stand. Alternatively the support can be a container or receptacle that receives the cutting matrix with a removable section for receiving the melon sections. The support can even be in the form of a large bowl with a cover that receives the cutting apparatus. The form of the support or base can be any type of support or base so long as the support can receive the cutting apparatus and hold it in position as the melon is being cut. In an embodiment, the support holds the apparatus in a stable and secure fashion such that when the cutting process is underway, the device does not move substantially. Any support now known or later developed can be used. The support, the arm, the pressure cap, and several parts of the assembly can be made from a metal or alloy (e.g., stainless steel), a composite material, rubber, plastic, and the like. The parts of the apparatus are preferably dishwater safe.

Apparatus 50 further includes carrying handles 34A and B formed into legs 4A and B, respectively. These handles are openings in the legs to allow one to carry or move the apparatus. One or more handles can be placed on any portion of the apparatus. The handles can be in the form of an opening, but can further be projections or ridges that extend from the apparatus and used for carrying the device. Any handle known in the art or developed in the future can be used for carrying an apparatus.

The base or support can be made of a single piece, or multiple pieces, as shown in FIG. 1. The members of the base or support can be held in place using any type of device for attachment or fastener. Examples of such attachment devices include screws, nuts, bolts, clips, and the like. The members can be made to complement one another for purposes of attachment, e.g., extension tab and slot arrangement, a tongue and groove arrangement. The members of the support or base can also be adhered to one another. For example, the members can be soldered together, or an adhesive can be used.

Base plate 2 shown in FIG. 1 includes an opening (not shown) to receive the cutting matrix. The opening is essentially a circular opening, however, the opening can be of any shape to complement the cutting matrix. For example, the opening can be of an oval shape. The opening can be cut into the base, or the base can be molded to contain the opening. The base plate further serves as points of insertion of other parts of the apparatus.

Figure 2:
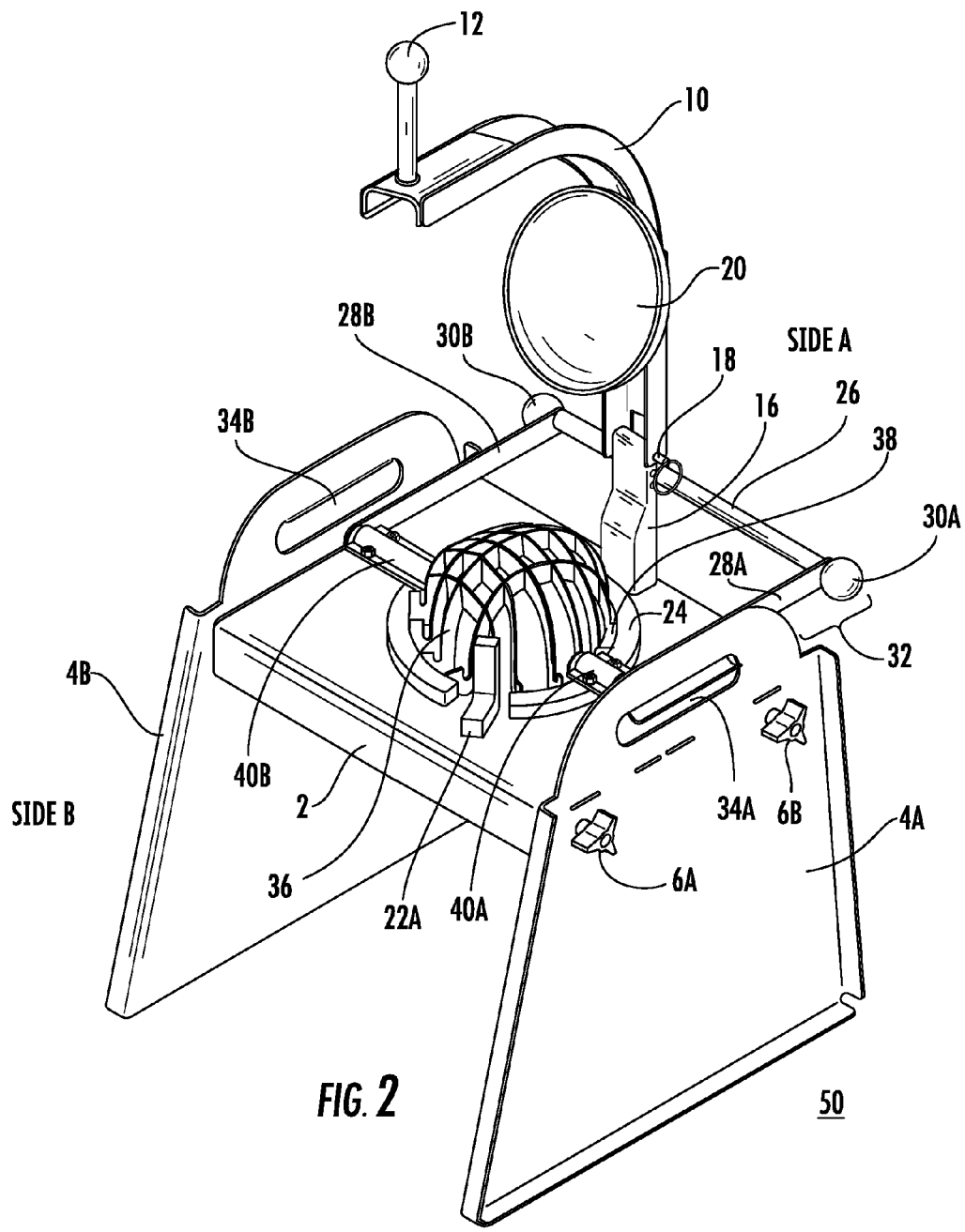
FIG. 2 is a schematic drawing of a perspective view showing the front and side of the apparatus of the present invention, but with the arm in the up position.

FIG. 1 also shows arm 10. Arm 10 is pivotally attached to base plate 2 via arm extension 16. Arm extension 16 serves to raise arm 10 high enough from base plate 2 to accommodate the thickness of a melon half, which is placed between pressure cap 20 and cutting matrix 36. Arm 10 is secured to arm extension 16 by locking pin 18. Locking pin 18 is a reversible attachment. Locking pin 18 can be pulled out to release the arm from the apparatus for cleaning. Locking pin 18 also allows arm 10 to pivot up and down so that the user can insert the melon half for cutting. Although, in this embodiment, the arm and arm extension are made up of two pieces, the arm can be made of a single piece. In such a case, the arm can be curved and one end attached to the base plate. In another embodiment, the arm can be made from a multitude of pieces with several joints to accomplish attachment from pressure cap 20 to base plate 2. The arm can be made of a single piece or multiple pieces, and can exhibit a curve or otherwise be angled. Additionally, the point of attachment of the arm can be anywhere on the support or base. There can be a single point of attachment, or more than one points of attachment (e.g., from 2 or 4 points of attachment). As shown in FIG. 2, arm 2 can be folded up in order to expose the cutting matrix for placing or removing a melon half.

Pressure cap 20 is also attached to arm 2 via adjustment screw 14, which is also a thumb screw. Pressure cap 20 is a concave or bowl-like device that holds the melon half in place during cutting. As such the pressure cap is mounted opposite the cutting matrix. The pressure cap can be any device that allows the melon half to stay in place. In an embodiment, it is preferable to have a pressure cap that complements at least a portion the shape of the object being cut, e.g., the complement of a melon half. In certain instances, pressure cap 20 does not fully cover an entire melon half, but covers a portion of it. In one instance, the present invention relates to a melon cutting apparatus in which the pressure cap covers between about 10% and about 100% of the object being cut. The pressure cap can be attached at one or more points to the arm. Additionally, the pressure cap can be of any shape (e.g., circular) and contact the melon half at one or more points. In one instance, the pressure cap is pivotally attached or can swivel to a certain degree. In such a case, it can more easily adapt to an irregularly shaped melon. In another aspect, the pressure cap does not pivot and/or can stabilize the melon half so that it does not slip substantially during cutting. The pressure cap can automatically adjust or align with the melon portion to be cut. The pressure cap can be made from any one of a number of rigid or flexible materials. In one instance, the pressure cap is made from a flexible sanoprene type plastic material. This allows the pressure applied to the melon half to vary at different points on the melon and thus causes the melon to flex and conform more accurately to the cutting matrix for better pulp removal. Typically, greater pressure is applied to the center of the melon (apex) and less pressure is applied to the equatorial region. Any device known or later developed can be used to hold the melon in place during cutting. Alternatively, the melon can be cut without a holding device or pressure cap, but rather with the melon placed on the blade matrix and the sweeper blade drawn through the melon.

The pressure cap shown in FIG. 1 can be adjusted along the arm using adjustment screw 14. A slot is placed on the arm, and is used to slide the pressure cap along the arm to accommodate the size and/or shape of the melon half. To adjust the position of the pressure cap, adjustment screw 14 is loosened, the pressure cap is positioned as desired, and then the adjustment screw is tightened. In place of an adjustment screw, the adjustment device can be a pin that is used with a plurality of pin holes (e.g., a spring engages the pin to allow for insertion into the pin hole). The adjustment device can be, e.g., a screw, pin, clamp, clip, fastener, and the like.

Additionally, the pressure cap can be lined with an anti-slip material to help prevent the melon from slipping. Such material includes, e.g., a rubberized surface. The pressure cap can further include grip fingers, clips, hooks or similar device to further increase its hold or grip on the melon half. After cutting of the melon is completed and the arm is pivoted to the up position, the melon rind lifts up along with the arm because the grip fingers are "gripping" the melon rind.

To assist in guiding the melon half onto the cutting matrix 36 and preventing the melon half from slipping sideways or tilting when the pressure arm 10 is lowered, extension guides 22A and 22B are employed. Extension guides 22A and 22B are fixed to base plate 2 with screws. Alternatively, extension guides can be held in a slot with a thumbscrew, thus allowing the guides to be movably adjusted for the size of the melon portion to be cut. One or more extension guides can be used as needed for the size and shape of the melon portion to be placed and cubed. The extension guides can be milled in various shapes to assist in guiding the melon portion. For example, the top of the extension can be tapered outwardly away from the cutting matrix while the bottom of the extension is closer to the cutting matrix, thus effecting a funnel type guiding process.

Handle 12 is also coupled to arm 10. Handle 12 is used to engage the downward cutting motion. In this instance, handle 12 is pushed downward and the cutting matrix, further discussed herein, cuts the melon half into sections. The handle, in this case, consists of a knob and a shaft or rod. The handle allows the user to engage the arm, which in turn, exerts a downward force onto the melon half. The downward force translates into a cutting action by the cutting matrix. The handle can be positioned and shaped to maximize the downward force of a user's hand. The knob and rod are only one example of a handle. The handle can also be a "U" shaped or oval shaped rod or bar that receives a person's fingers, and is attached to the arm. The handle can also be ergonomically shaped and/or padded to receive one or both hands of a user. In place of handle 12, a lever (e.g., a push down lever) or similar device can be used to create the downward force.

Referring to FIG. 2, arm 10 has been pivoted to the "up" or "open" position, exposing cutting matrix 36. The cutting matrix is composed of one or more (e.g., a plurality of) blades that intersect one another. The blades can intersect at a number of angles, e.g., at an angle between about 15° and about 85°, and preferably between about 20° and about 45°. Blades can be made in any thickness but, in an embodiment, the thickness of the blade is less than about 0.100 inches. In an embodiment, a blade of this thickness is typically better for cutting melons as it minimizes damage to the melon sections when forced through a cutting matrix. In an aspect, angle of blade incidence is typically 30 degrees or less. In an embodiment, the ends of the blades are curved upward to aid in the sectioning. The cutting matrix is also curved to complement in inside of the melon half. The matrix, in one aspect, is essentially a semicircle shape, but can be arched in any manner. In another embodiment, the matrix forms an egg or elliptical shape. The blades can be soldered to one another, or made to complement one another to form the matrix. For example, complementary slots can be milled into the blades opposing one another and fit together. Additionally, the entire matrix can also be attached (e.g., welded or soldered), snapped, clipped, screwed (e.g., with one or more brackets) into place.

The cutting blades of the matrix, in FIG. 2, are attached such that the melon is sectioned into cubes. However, the blades can be configured and shaped to cut the melon into different geometric shapes, e.g., stars, hearts, letters, numbers, etc. In an embodiment, the apparatus can come with a variety of matrixes or adaptors that can be used to create various shaped melon sections for various occasions.

Apparatus 50 further includes sweeping blade 38 that is engaged or triggered by actuator 32. Sweeping blade 38 is a semicircular blade that cuts the melon half in a semispherical motion, while being close to and along a similar parallel to the rind. The sweeping blade, in an embodiment, is cut from a material of thickness 0.200 inches or less to minimize damage to melon sections. Actuator 32 includes rod 26, which is perpendicularly attached to bars 28A and 28B with knobs 30A and 30B. Bars 28A and 28B are each attached to a screw (not shown) that communicates with sweeping blade 38. The screws are housed by screw shafts 40A and 40B. The user engages the actuator, which in turn, activates the sweeping blade, e.g., causing the sweeping blade to move. The sweeping blade begins its motion from the position shown in FIGS. 1 and 2, which shows the blade on Side A. When the arm is in the closed position, the sweeping blade moves over the cutting matrix in a semicircular fashion and about the axis formed by the screw shafts, thereby cutting the rind from the melon pulp. When the sweeping blade completes its motion, the actuator and the sweeping blade are on Side B, at which point the cut sections fall through the opening underneath. As with the cutting matrix, the shape of the sweeping blade is semicircular, but can be a shape that complements the melon half, e.g., and includes an egg-shape or elliptical shape. The actuator, in this case, is a rotating handle mechanism, but can be a crank or a rotating knob mounted in line with the screw shafts to effectuate the rotation of the sweeping blade. Any actuating device can be used so long as the device causes the sweeping blade to rotate and its path forms a semispherical motion. In an embodiment, the blade is sharpened only on one side, and in another embodiment, the blade is sharpened on both sides (e.g., so that it can be reversed when the blade gets dull on a side). In another embodiment, the blade is replaceable and the present invention includes a blade shaped in essentially a semicircular shape or similar shape, as described herein, for use with the apparatus of the present invention. In another embodiment, the apparatus of the present invention contains a cutting matrix and two sweeping blades, wherein one sweeping blade is positioned on the outside (or top) of the cutting matrix and a second sweeping blade is positioned on the inside (or bottom) of the cutting matrix, thereby cutting the melon pulp into smaller sections (or cubes) e.g., when the melon pulp happens to be very thick. Both the sweeping blade and the cutting matrix can be made from stainless steel or any other metal alloy (e.g., titanium). Any material known in the art or developed in the future can be used to make the cuttings blades or matrixes.

Figure 3:
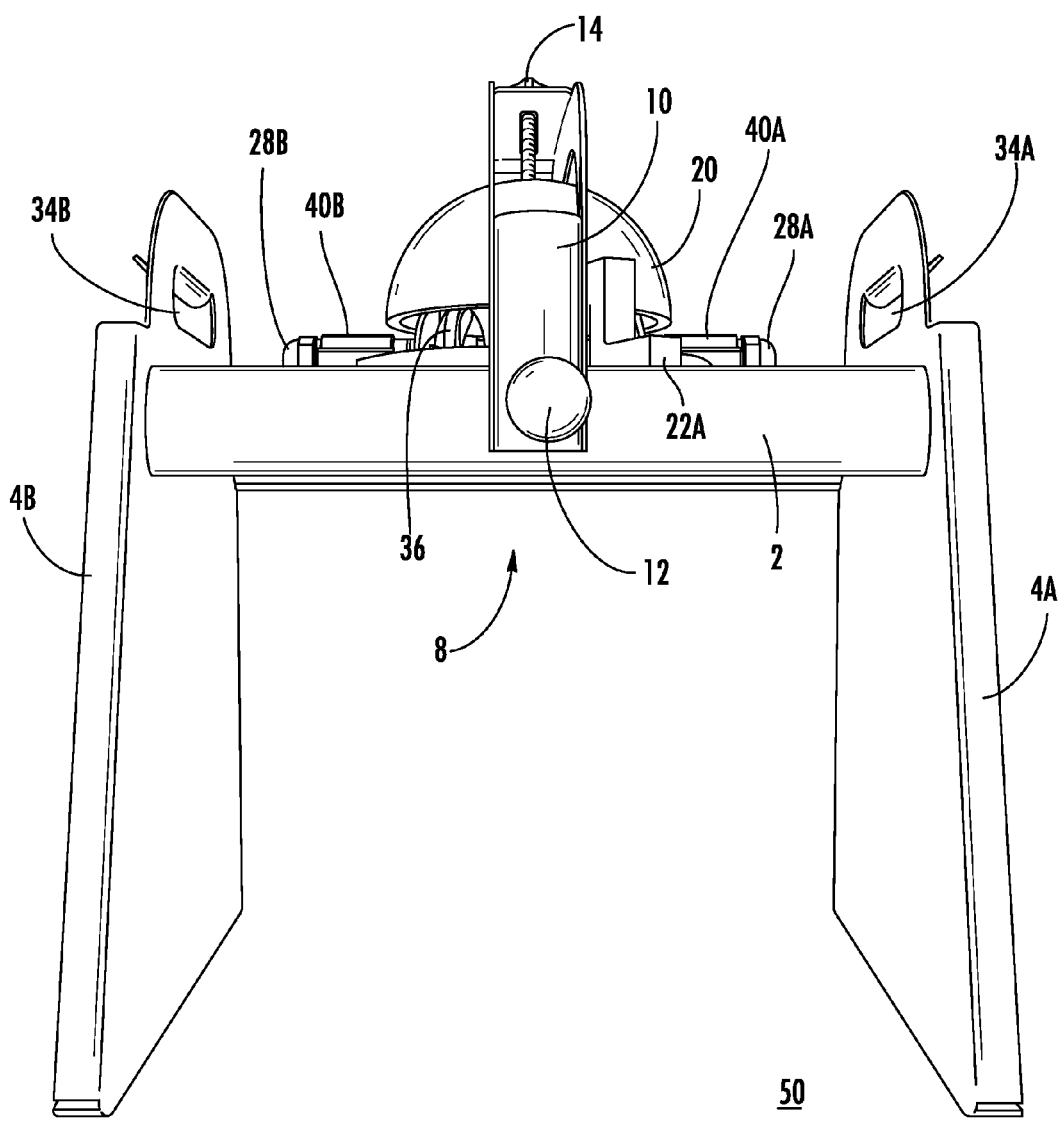
FIG. 3 is a schematic drawing of the front view of the apparatus of the present invention.
Figure 4:
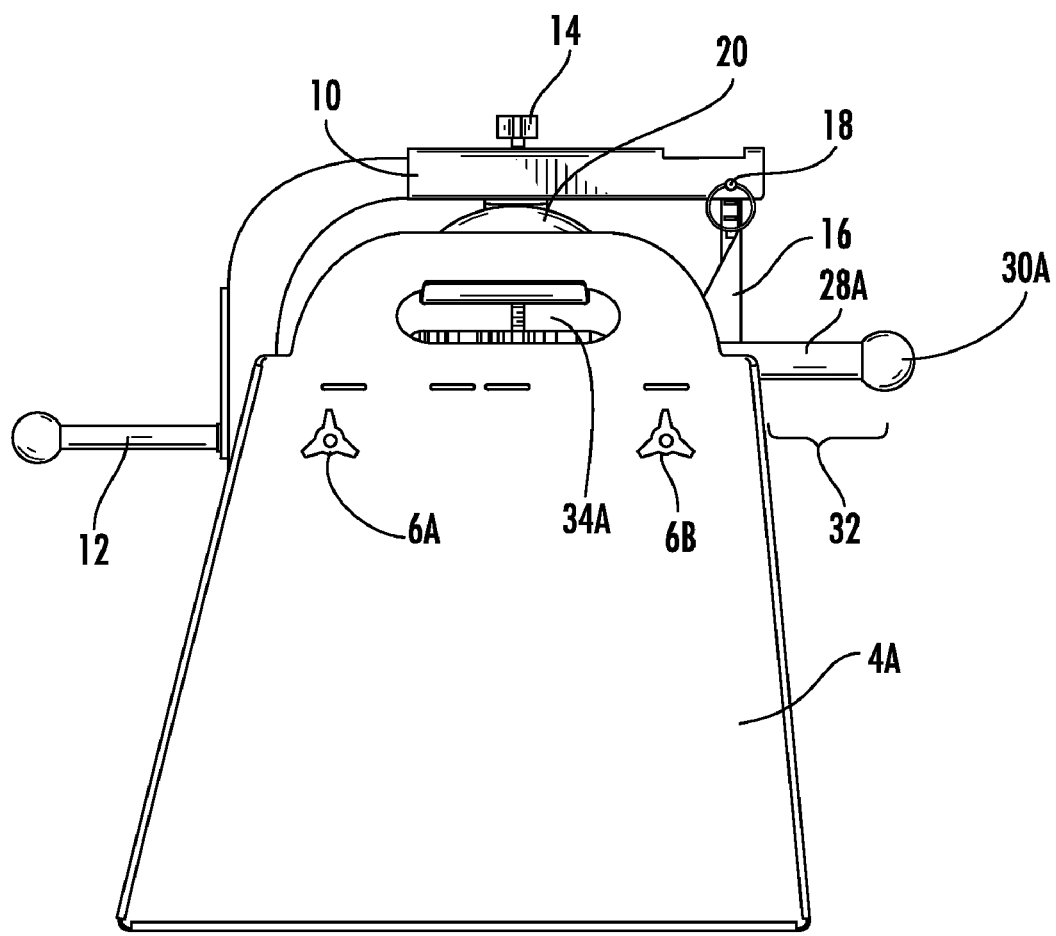
FIG. 4 is a schematic drawing of the side view of the apparatus of the present invention.
Figure 5:
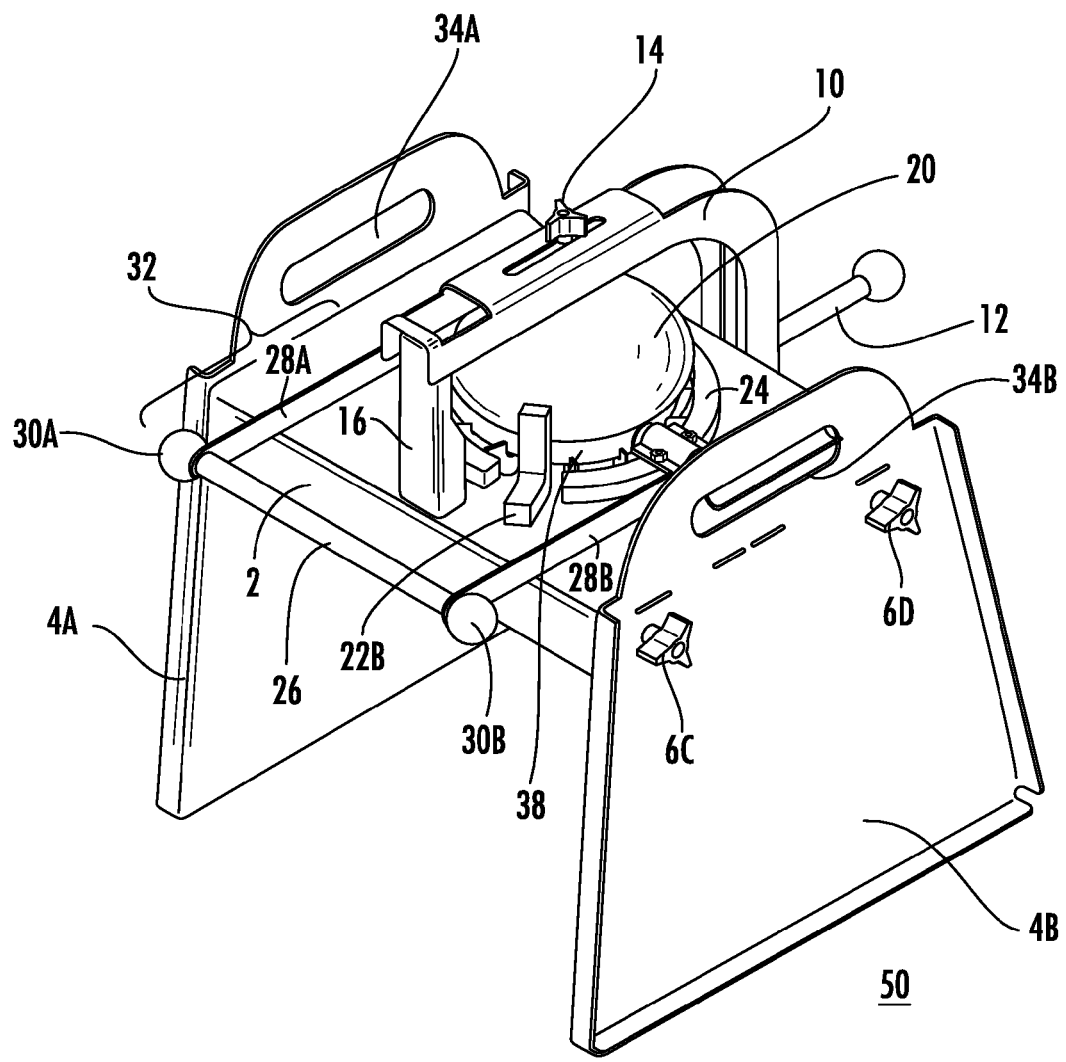
FIG. 5 is a schematic drawing of a perspective view showing the back and other side of the apparatus of the present invention.
Figure 6:
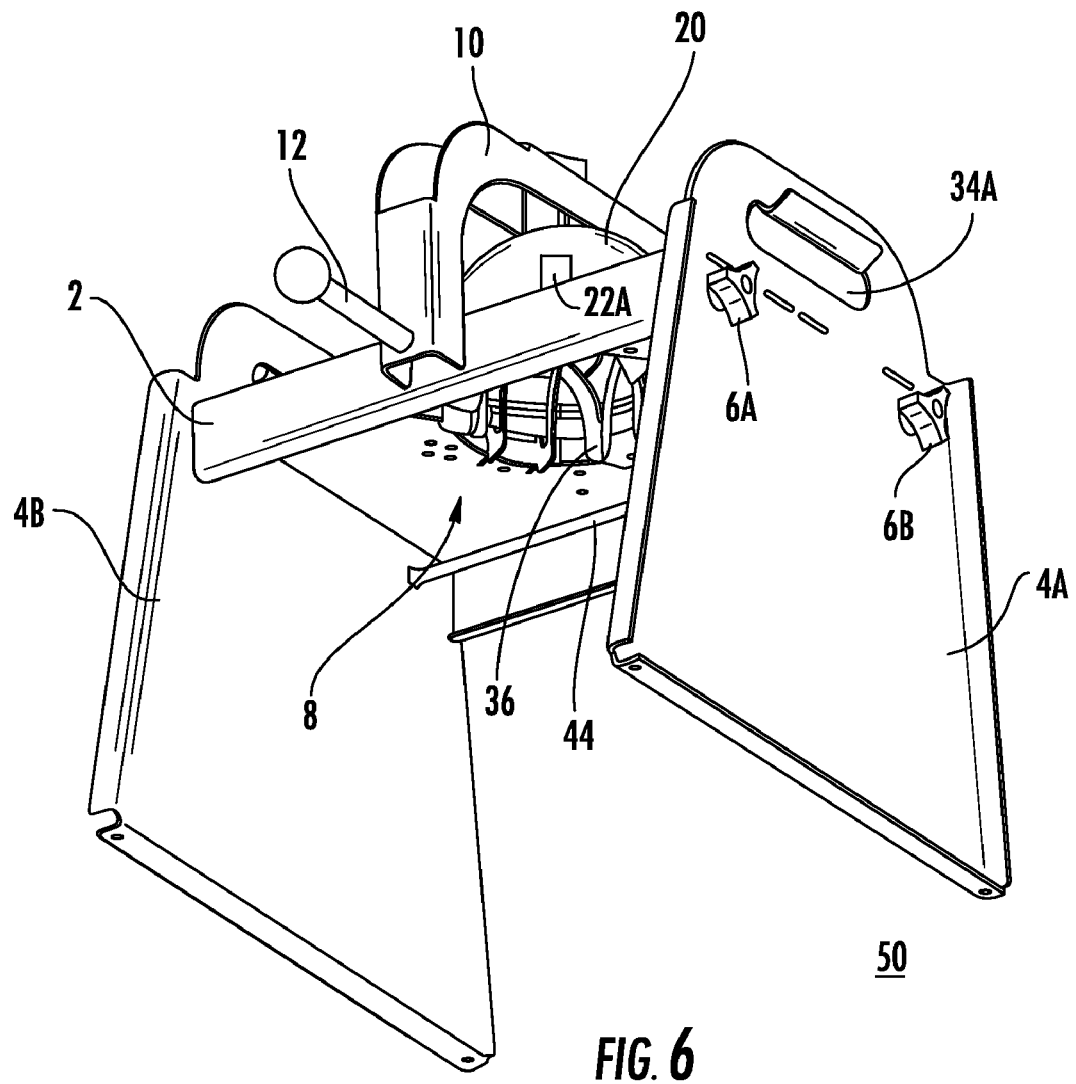
FIG. 6 is a schematic drawing of a perspective view showing the underside of the apparatus of the present invention.
Figure 7:
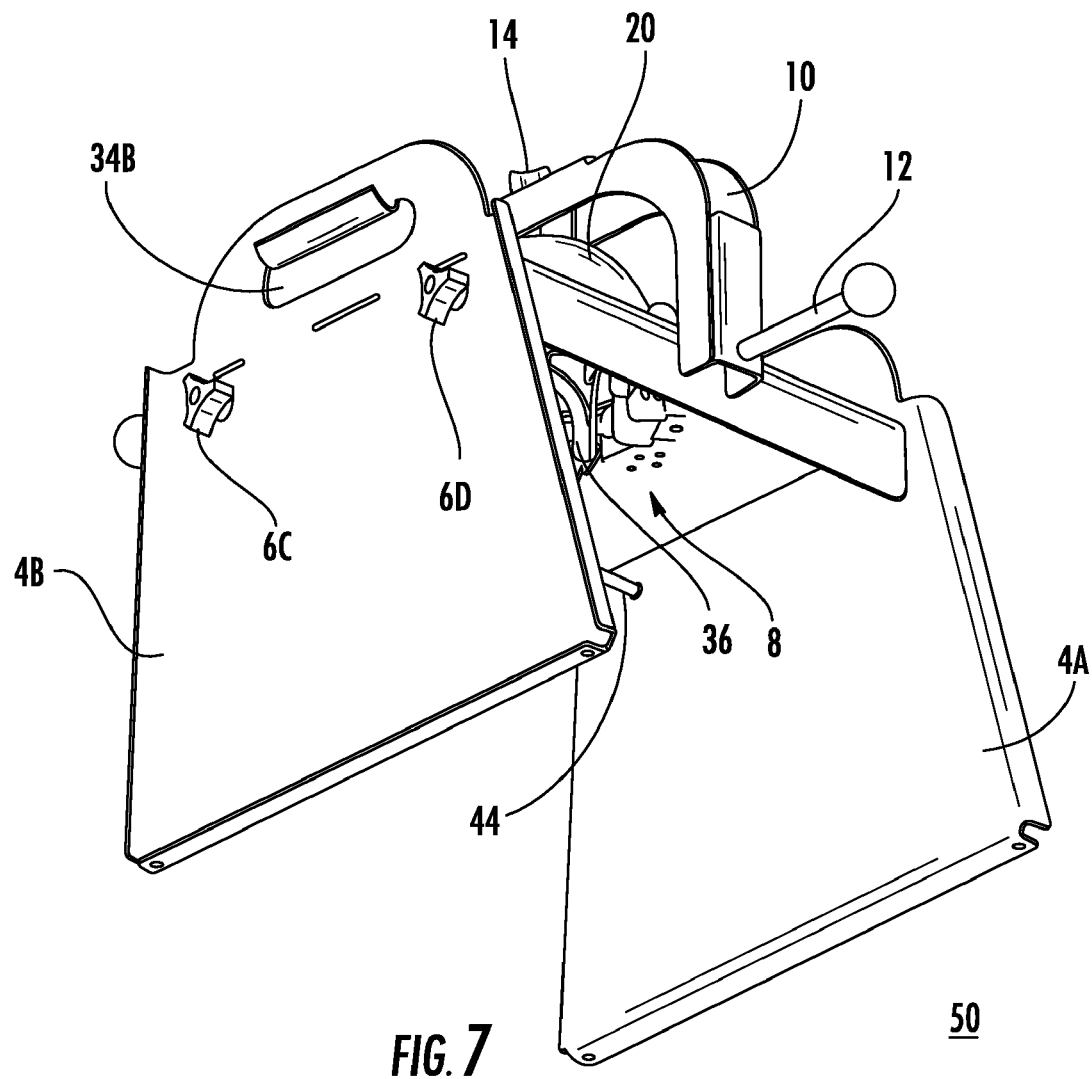
FIG. 7 is a schematic drawing of another perspective view showing the underside of the apparatus of the present invention from another angle.

FIG. 3 and FIG. 4 show a front view and a side view, respectively, of apparatus 50 in which the arm is in a closed or down position. FIG. 5 shows a perspective view of the back of apparatus 50, but from the opposite view of that shown in FIG. 1. FIGS. 6 and 7 show perspective views of the underside of the apparatus of the present invention. The shape and blades of the cutting matrix can be seen. Support bar 44 is also used to add additional stability to the apparatus. Additional supports can be added in the form of e.g., cross-braces, bars, rods, blocks, and the like. Furthermore, opening 8, through which the melon sections fall, can also be seen.

The present invention also relates to a method of using the apparatus of the present invention. The methods of the present invention include placing a melon half, face down onto the cutting matrix. The steps of the method also include engaging the arm to apply a downward force onto the melon half, to thereby cut one or more sections. The steps of the method further embody activating the actuator, which engages the sweeping blade, to thereby separate the rind from the melon pulp. The melon sections then fall through the opening, e.g., into a bowl. The user can then place or pivot the arm into the up position. The method further includes preparing the melon half by performing one or more of the following steps: cleaning the melon, cutting a whole melon in half, and removing the seeds. The arm can be attached and removed by engaging the locking pin. The arm can be removed for storing or cleaning. Yet another embodiment of the method includes adjusting the pressure cap using the adjustment screw.

The present invention also encompasses methods for assembling the apparatus. The apparatus is assembled by securing the legs to the base plate by engaging the thumb screws. The arm can be attached by inserting the locking pin. In the case in which the cutting matrix is not pre-attached, the cutting matrix can be inserted or attached to the base plate. Additionally, the pressure cap can be attached and/or adjusted with the adjustment screw. Alternatively, the pressure cap can be adjusted by other free-pivoting methods of attachment, with or without manual adjustment being necessary.

The present invention further pertains to a system for sectioning melons. The system includes any part of the apparatus, as described herein, and/or one or more of the following: sweeper blades, cutting matrixes, bowls, locking pins, various size pressure caps, pairing knifes, and any replacement part described herein (e.g., thumb screws, adjustment screws).

Exemplification

The apparatus shown in FIGS. 1-7 was made. The apparatus was made by cutting stainless steel sheets into the shape of the legs and the base as shown in the figures. The base plate measured 11 inches by 14 inches, and included 4 extension tabs on either side to guide the legs properly into the base plate. The extension tabs are asymmetric on opposing sides to ensure that the legs are assembled correctly, with the flanges facing outward on both sides. An opening having the size of 6 inches was cut in the base plate to receive the cutting matrix. The legs including openings to receive the extension tab of the base plate, and additional openings were cut to create carrying handles (handle 34A and 34B). The legs were secured to the base plate by passing threaded rods 44 through legs 4A and 4B and securing the rods with 4 thumb screws 6A-6D.

The blade matrix was made by cutting 0.031 inch thick stainless steel into semicircular arcs of 5.0 inch diameter sphere. The blade ring 24 for the blades was molded from plastic. The blades were attached to each other by cutting complementary slots in the blades and arranging the blades to transect one another, and shaped into an essentially semispherical shape, as shown in the figure. The blades were then attached to the blade ring 24 by heat staking. The blade ring 24 was attached to base 2 with screws.

The actuator of the apparatus was made from two stainless steel bars, a rod and two knobs. The bars were cut to include an opening at each end, and the rod was threaded to receive the knob. The parts were assembled, as shown in the figures, and the knob was tightened to hold the actuator in place. The other ends of the bars were attached to a screw that passed through the screw shaft, and attached to the sweeping blade.

The sweeping blade was cut from 0.060 inch stainless steel, sharpened on one side by grinding, and attached to the screw that passes through the screw shaft with a nut and food grade threadlock.

A plastic block was milled and tapped. It was screwed to the base plate using silicone as a gap sealant and formed the presser arm extension. The block was drilled to receive a locking pin. The arm, also of stainless steel, was cut, formed, and welded into the shape shown in the figure. The pressure cap was molded from a pliable material such as urethane. A screw was inserted into the apex of the cap during molding for mounting to the pressure arm. The pressure cap is adjustably mounted to the arm with another thumb screw. A handle made from a rod and knob, was screwed to the end of the arm to allow one to raise and lower the arm. This handle is also used to apply downward pressure to the melon to engage the cutting matrix and cut the melon into sections.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A melon cutting apparatus that cuts a melon portion, the apparatus comprises:
   a. a base having an opening;
   b. a cutting matrix that comprises one or more matrix unidirectional blades, wherein the cutting matrix communicates with the opening;
   c. one or more sweeping undirectioanl blades that comprise a first end and a second end, and the first and second ends are positioned at or near the cutting matrix and the first and second ends form an axis; and wherein the sweeping blade is curved, wherein the matrix blades and the sweeping blades are separate structures and the sweeping blade rotates about the axis and wherein the sweeping blade cuts the melon during rotation about the axis; and d. an actuator that engages the sweeping blade, wherein the actuator comprises a handle, wherein when engaged, the actuator causes the sweeping blade to move about the axis.

2. The melon cutting apparatus of claim 1, further comprising an arm attached to the apparatus, and a pressure cap that is mounted to the arm, opposite the cutting matrix.

3. The melon cutting apparatus of claim 2, wherein the pressure cap is flexible.

4. A melon cutting apparatus of claim 2, wherein the pressure caps automatically adjusts or aligns.

5. A melon cutting apparatus of claim 2, wherein the pressure caps pivots.

6. The melon cutting apparatus of claim 2, wherein the arm is removably attached to an arm extension mounted to the base.

7. The melon cutting apparatus of claim 2, wherein the arm is removably attached with a pin.

8. The melon cutting apparatus of claim 1, further comprises one or more legs that support the base.

9. The melon cutting apparatus of claim 1, wherein the cutting matrix forms a semispherical or semi-elliptical shape.

10. The melon cutting apparatus of claim 1, wherein the cutting matrix forms a symmetrical shape about at least one axis.

11. The melon cutting apparatus of claim 1, further including one or more guides mounted to the base to guide the melon.

12. The melon cutting apparatus of claim 2, wherein the position of the pressure cap is adjustable.

13. The melon cutting apparatus of claim 1, wherein the actuator rotates the blade so that the blade's path forms essentially a semispherical or semi-elliptical shape.

14. A melon cutting apparatus that cuts a melon portion, wherein the melon portion comprises melon pulp and melon rind, the apparatus comprises:
   a. a base plate having an opening;
   b. one or more legs that support the base plate;
   c. a cutting matrix that comprises a plurality of unidirectional blades, wherein the cutting matrix communicates with the opening and forms essentially a semi-spherical or semi-elliptical shape;
   d. one or more sweeping unidirectional blades that comprises a first end and a second end, and the first and second end are positioned at or near the cutting matrix and the first and second ends form an axis; and wherein the sweeping blade is mated to the cutting matrix and the matrix blades and the sweeping blades are separate structures and the sweeping blade rotates about the axis, and wherein the sweeping blade cuts the melon during rotation about the axis;
   e. an actuator that engages the sweeping unidirectional blade, wherein the actuator comprises a handle, wherein when engaged, the actuator causes the sweeping blade to move about the axis and wherein the sweeping blade forms a path that is essentially a semispherical or semi-elliptical shape about the cutting matrix;
   f. an arm attached to the base plate; and
   g. a pressure cap that is mounted to the arm, opposite the cutting matrix;
   wherein the apparatus cuts the melon pulp into sections and removes the melon rind.

15. The melon cutting apparatus of claim 14, further including one or more guides mounted to the base to guide the melon.

16. A method of using the melon cutting apparatus of claim 1, the method comprises:
   a. placing a melon portion on the cutting matrix;
   b. applying pressure to the arm to section the melon pulp; and
   c. engaging the actuator that causes the sweeping blade to cut the rind from the melon portion to thereby release the sectioned melon.

17. The method of claim 16, further comprising lifting the arm of the apparatus and removing the rind.

18. The method of claim 16, further comprising adjusting or pivoting the pressure cap to the melon portion.

19. A method of assembling the melon cutting apparatus of claim 14, the method comprises:
   a. attaching the cutting matrix to the base plate; and
   b. attaching the arm to the base plate.

20. A melon cutting system; the system comprises:
   a. a base plate having an opening;
   b. one or more legs that support the base plate;
   c. one or more cutting matrixes, wherein a cutting matrix comprises a plurality of unidirectional blades that forms essentially a semi-spherical or semi-elliptical shape;
   d. one or more sweeping unidirectional blades wherein the sweeping blade is mated to the cutting matrix, wherein the sweeping blades that comprise a first end and a second end and the first and second ends form an axis, and wherein the matrix blades and the sweeping blades are separate structures and the sweeping blade rotates about the axis and wherein the sweeping blade cuts the melon during rotation about the axis;
   e. an actuator that engages the sweeping blade, wherein the actuator comprises a handle, wherein when engaged, the actuator causes the sweeping blade to move about the axis;
   f. an arm;
   g. a pressure cap; and
   h. a combination thereof.

21. The system of claim 20, further including a bowl.

* * * * *